United States Patent [19]
Plegat

[11] 3,776,082
[45] Dec. 4, 1973

[54] APPARATUS FOR CUTTING A TUBE INTO SEGMENTS

[75] Inventor: Alain Edouard Plegat, Asnieres, France

[73] Assignee: Societe Anonyme Des Usines Chausson, Asnieres, France

[22] Filed: Oct. 19, 1971

[21] Appl. No.: 190,587

[30] Foreign Application Priority Data
Oct. 22, 1970 France .............................. 7038157

[52] U.S. Cl.................... 83/304, 83/293, 83/286, 83/310, 83/314, 83/374
[51] Int. Cl. ........................................ B23d 25/02
[58] Field of Search....................... 83/31, 206, 298, 83/304, 305, 374, 310, 306, 307, 285, 286, 293, 314

[56] References Cited
UNITED STATES PATENTS

| 3,193,770 | 7/1965 | Pozsgay ........................... 83/293 X |
| 2,350,975 | 6/1944 | Rodder et al. ...................... 83/293 |
| 2,325,431 | 7/1943 | Shippy ................................ 83/293 |
| 2,198,599 | 4/1940 | Borzym............................. 83/293 X |
| 2,133,542 | 10/1938 | Jensen ................................ 83/293 |

*Primary Examiner*—Andrew R. Juhasz
*Assistant Examiner*—W. D. Bray
*Attorney*—Imirie and Smiley

[57] ABSTRACT

The apparatus comprises a guide for guiding a tube to be cut off by a cutting device, a retractable stop component for alternately pivoting the guide in order to engage the tube under the cutting device and means for the control of said retractable stop component.

5 Claims, 2 Drawing Figures

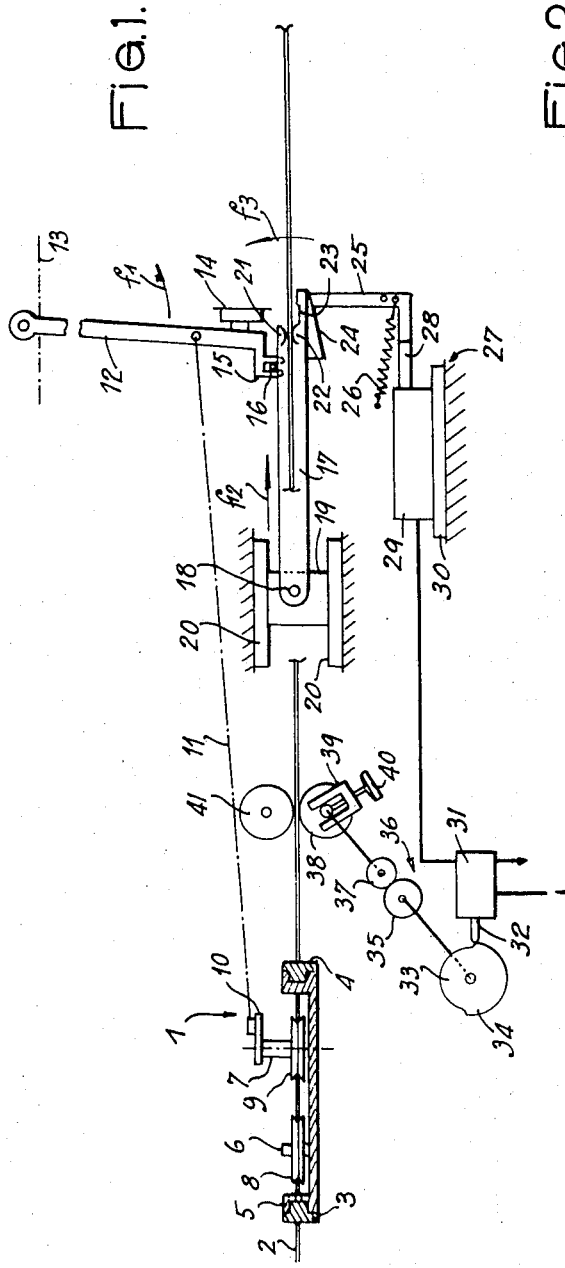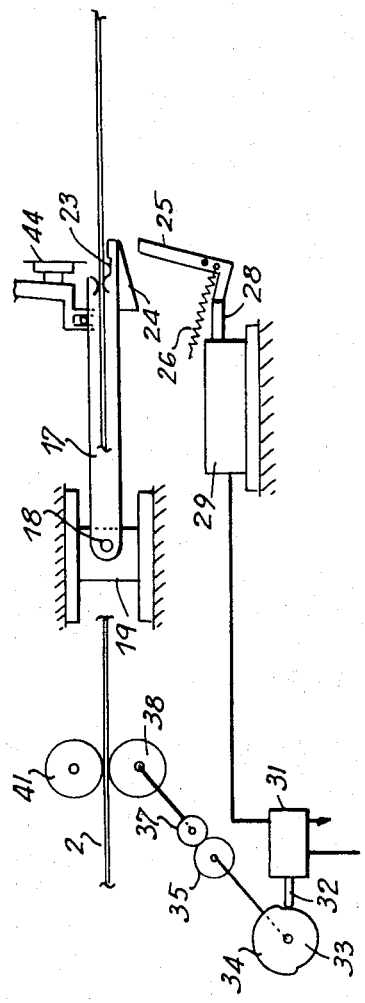

3,776,082

APPARATUS FOR CUTTING A TUBE INTO SEGMENTS

BACKGROUND OF THE INVENTION

In some industrial fields, and particularly in the art of radiators for vehicle engines, cutting apparatus are utilized to form, from a continuously moving, tube, tubular elements of strictly equal length, for forming radiator cores.

In general, the machines of that type are adjusted to cut tubular elements of a predetermined basic length and are provided with adjustment means enabling a small variation of siad basic length. However, for some manufacturing, tubes are required which have a length equal to a multiple of a basic reference length.

This invention solves the above mentioned problem by means of a cutting apparatus to be adapted to a machine for cutting a continuously formed or continuously moving tube.

SUMMARY OF THE INVENTION

According to the invention, the device apparatus comprises an articulated guide moved in synchronism with the tube along the path thereof and laterally guiding said tube, a cutting device also moved in synchronism with the tube, said cutting device being placed ahead of said guide, a retractable stop element cooperating with said guide to cause to and fro pivoting of the same in a direction in which the tube engages the cutting device, and means for the control of said retractable stop component.

BRIEF DESCRIPTION OF DRAWING

FIG. 1 is a diagrammatic view of the apparatus according to the invention.

FIG. 2 is a fragmentary diagrammatic view, similar to FIG. 1, showing the apparatus according to the invention a particular step of operation.

DETAILED DESCRIPTION OF THE INVENTION

As shown in FIG. 1, the device of the invention is attached too, a cutting machine 1 placed after another machine (not shown) that continuously forms, at high speed, a tube 2,. The cutting machine 1 includes two pillars 3 and 4 for the vertical guiding of a carriage 5, with adjustable position, supporting, by means of two spindles 6 and 7, the measuring wheels 8 and 9, placed upright with two wheels or belt-guides (not shown) for maintaining and tightening the tube 2. The measuring wheels 8 and 9 are selected for the length of their circumference which exactly corresponds to the basic length of tube.

The spindle 7 of wheel 9 supports a crank 10 on which a connecting rod 11 is articulated, the crosshead thereof being articulated on an arm 12 swivelling on a plate 13. Close to its free end, the swivelling arm 12 supports a circular saw 14 connected through a suitable transmission to a driving component supported, for example, by a plate 13. The free end of the swivelling arm 12 also forms a capping 15, the arms of which surround a roller 16 supported by a lever 17 placed on the pivot 18 of a sliding bar 19 guided between two sliding guides 20 also placed on each side of the feeding spindle of the tube 2 and beneath the same.

Opposite pivot 18, the lever 17 is provided with two guides 21 and 22 shaped to delimit an introduction and guiding interval with divergent edges, the smallest section thereof corresponding approximately to the cross-section of tube 2. The guide 21 is notched in front of the saw 14 and the guide 22 has a corresponding notch 23. The lever 17 also delimits a sloped plane or cam 24 to which co-operates the end of a pawl 25 applied by a spring 26 against a stop 27.

According to the invention, the stop 27 is constituted by a movable element for example by the piston rod 28 of a jack 29 placed on the frame 30 of the cutting machine. The jack 29 is connected to a distributor 31 including a valve 32 operated by a cam 33 forming an cam surface 34 extending on an arc length substantially equal to 180°. The cam 33 is driven by pinion 35 of a reducing gear 36 of which the other pinion 37 is connected to a measuring wheel 38. The reading wheel 38, placed either horizontally or vertically in relation with tube 2, is positioned on a frame 39 having a component 40 for adjusting the interval with respect to a supporting and guiding counter-wheel 41.

In the example represented on the drawing, the wheels 38 and 41 are selected for the length of their circumference which correspond to the basic length of the tube sections under production, while pinions 35 and 37 are selected to introduce a reducing ratio of ½ between wheel 38 and cam 33.

The device, above described, works as follows:

In the position shown on FIG. 1 the cam surface 34 of cam 33 operates the valve 32 to maintain the distributor 31 ready to feed the jack 29 corresponding to the extension of the piston rod 28. The piston rod operates the pawl into swivelling against the action of the spring 26 so as to maintain said pawl against the sloped plane 24 of the lever 17.

Driving into rotation the wheel 9 by tube 2 rotates the crank 10 which works, through crank-head 11 to swivel the arm 12 in the direction of arrow $f_1$. Consequently, the capping 15 drives the lever 17 in the direction of arrow $f_2$ through the motion of sliding bar 19 between the sliding guides 20. The kinematic connection between wheel 9 and arm 12 is designed in order that, at some given moment of the swivelling stroke thereof, said arm be driven to a linear speed equal to the one of the tube 2, as well known in the art. During the above described step, the wheel 38 driven by the tube 2 transmits the rotation thereof to the cam 33 but said cam has no immediate action on the position of distributor 31, since the embossing 34 of said cam still maintains the valve 32 in the position of feeding the jack 29.

The motion of the lever 17 in the direction of arrow $f_2$ causes the motion of the sloped plane 24 in front of the pawl 25 which is immobilized by the piston rod 28. Consequently, by reaction on the sloped plane 24, the pawl 25 controls, in the direction of arrow $f_3$, the angular swivelling of the lever 17 which brings by means of the guides 21 and 22 the tube 2 against the circular saw 14 thus ensuring the cutting of the portion of tube 2 having passed the notch 23.

Though not represented, the portion of tube after having been cut is then picked-up by a piling mechanism or by a mechanism placing said portions of tubes into a loader. Following this operation, the sloped plane 24 is released from pawl 25 whereby the lever 17 returns to its original position so as to remove the subsequent portion of tube 2 from the saw 14.

After the swivelling stroke in the direction of arrow $f_1$, and as above described, the crank 10 controls the swivelling of arm 12 in the opposite direction, whereby driving the translation of the lever 17 in the direction opposite the direction of arrow $f_2$. During said backing stroke, the abrupt face delimiting the sloped plane 24 rests on pawl 25, said pawl swivelling against the action of spring 26 and thus retracts. The mobile equipment constituted by the sliding-bar 19, equalizing lever 17 and swivelling arm 12 is then returned to the initial position thereof.

The above described operating step corresponds to a one-turn rotation of the measuring wheel 38, whereby the cam 33 has made a half-turn. The result is that at the moment when the mobile equipment returns to its initial position after an operating cycle, the cam 33 has, under the valve 32, the release consecutive to the cam surface 34, which reverses the position of distributor 31. The jack 29 is no longer fed and the piston rod 28 is retracted whereby the pawl 25 is swivelled, as shown on FIG. 2. The next operating cycle, controlled by crank 10, reoccurs as above described, but without causing the swivelling of lever 17 in the direction of arrow $f_3$. In fact, due to the retraction of pawl 25, said pawl is kept out from the stroke of the inclined plane 24, whereby the lever 17 remains in line with the tube 2 which consequently is not put into contact with the circular saw 14. This operating step corresponds to a miss-cut and consequently, when the mobile equipment returns to its original position, the portion of tube having passed the notch 23, has a length appreciably equal to the double of the basic length determined by wheels 9 and 38. During the third operating step, the device is returned to the conditions shown in FIG. 1, then realizing only the cutting of the portion of tube which effectively has a length double of the reference length.

As it appears from above, the device of the invention makes it possible to place the cutting device of the machine in the operative state every two cycles but it is obvious that a different ratio can be obtained by changing the pinions 35 and 37 or the cam 33 to introduce a different ratio of lower or higher reduction than half of the reference length as initially determined.

In the example hereinbefore described, the device is designed to control the operation of a cutting mechanism composed of a circular saw 14. It is obvious that said device could be applied to other cutting mechanisms, for example transverse shears, of which the motion transversal to the tube 2 could be directly controlled by jack 29.

When said miss-cut device must be made inoperative, the wheel 38 has only to be removed from the tube 2.

The invention is not restricted to the embodiment shown and described in detail for various modifications thereof can moreover be applied to it without departing from the scope of the invention. It is particularly to be noted that the pawl 25 can be cancelled and the jack 29 can be placed in view of directly cooperate with the sloped plane or cam 24.

I claim:

1. An apparatus for cutting a tube into segments comprising an articulated guide, means for moving said guide along the path of a continuously moving tube in synchronism therewith and laterally guiding the tube, a cutting device also moved in synchronism with the tube, said cutting device being disposed in front of said guide, a retractable stop engageable with said guide to reciprocate said guide in a direction to cause the tube to engage said cutting device, and means for controlling said movement of said retractable stop.

2. Apparatus as set forth in claim 1, wherein said retractable stop comprises a spring urged pawl, and a cam on said guide and disposed in the path of said pawl, wherby said cam causes the pivoting of the guide toward the cutting device against said spring.

3. Apparatus as set forth in claim 2, wherein the means for controlling said retractable stop comprise a measuring means determining the tube advance movement, a reduction gear driven by said measuring means, a second cam connected to said reduction gear, a distributor operated by said second cam and a control jack engaging said spring urged pawl, whereby said pawl is displaced to be out of the path of said guide when said jack is operated by said second cam.

4. Apparatus as set forth in claim 1, wherein said guide is connected by an articulation to a pendular arm supporting a saw and connected by a connecting rod assembly to a unit of wheels for measuring the tube advance.

5. Apparatus as set forth in claim 1 including a mechanism for releasing said means for the control of said retractable stop.

* * * * *